(12) United States Patent
Thomas et al.

(10) Patent No.: US 8,341,695 B2
(45) Date of Patent: Dec. 25, 2012

(54) METHOD OF ACCESS CONTROL IMPLEMENTED IN AN ETHERNET SWITCH

(75) Inventors: Beth A. B. Thomas, Brown Deer, WI (US); Steven L. Whitsitt, Rustic Way, WI (US)

(73) Assignee: Honeywell International Inc., Morristown, NJ (US)

( * ) Notice: Subject to any disclaimer, the term of this patent is extended or adjusted under 35 U.S.C. 154(b) by 957 days.

(21) Appl. No.: 12/113,806

(22) Filed: May 1, 2008

(65) Prior Publication Data

US 2009/0328152 A1 Dec. 31, 2009

(51) Int. Cl.
H04L 29/06 (2006.01)
(52) U.S. Cl. ............. 726/2; 726/1; 726/3; 726/4; 726/5; 726/9; 726/16; 726/17; 726/19; 726/20; 726/21; 713/182; 713/183; 713/184; 713/185; 713/186; 340/5.1; 340/5.2; 340/5.21; 340/5.28; 340/5.3; 340/5.7; 340/5.71; 340/5.72; 340/5.8
(58) Field of Classification Search .................. 726/1–5, 726/9, 16–21; 340/5.1–5.33, 5.7–5.85; 713/182–186
See application file for complete search history.

(56) References Cited

U.S. PATENT DOCUMENTS

| | | | | |
|---|---|---|---|---|
| 4,148,012 A | * | 4/1979 | Baump et al. ................ | 340/5.33 |
| 7,623,518 B2 | * | 11/2009 | Faulk, Jr. ...................... | 370/392 |
| 8,214,640 B2 | * | 7/2012 | Das et al. ..................... | 713/160 |
| 2004/0184401 A1 | * | 9/2004 | Nguyen et al. ................ | 370/216 |
| 2007/0186106 A1 | | 8/2007 | Ting et al. | |
| 2009/0231091 A1 | * | 9/2009 | Burwell et al. ............... | 340/5.2 |

FOREIGN PATENT DOCUMENTS

WO    WO 2006/021047 A1    3/2006

OTHER PUBLICATIONS

Context-based Access Control for Ubiquitous Service Provisioning by Corradi et al; Publisher: IEEE; Year: 2004.*

* cited by examiner

*Primary Examiner* — Thanhnga B Truong
*Assistant Examiner* — Madhuri Herzog
(74) *Attorney, Agent, or Firm* — Husch Blackwell

(57) ABSTRACT

An access control system, having at least one access control unit for securing a physical area and controlling entry into and egress out of the physical area, and an Ethernet routing device, is disclosed. The Ethernet routing device includes an access controller for determining access privileges to the physical area; an Ethernet switching unit for directing network communications between multiple network devices; at least one Ethernet connector for connecting the at least one access control unit to the Ethernet routing device; and an access control message interpreter for reading messages received, by way of the Ethernet connector, from the at least one access control unit and providing access control information contained in the messages to the access controller for access privilege determination.

9 Claims, 4 Drawing Sheets

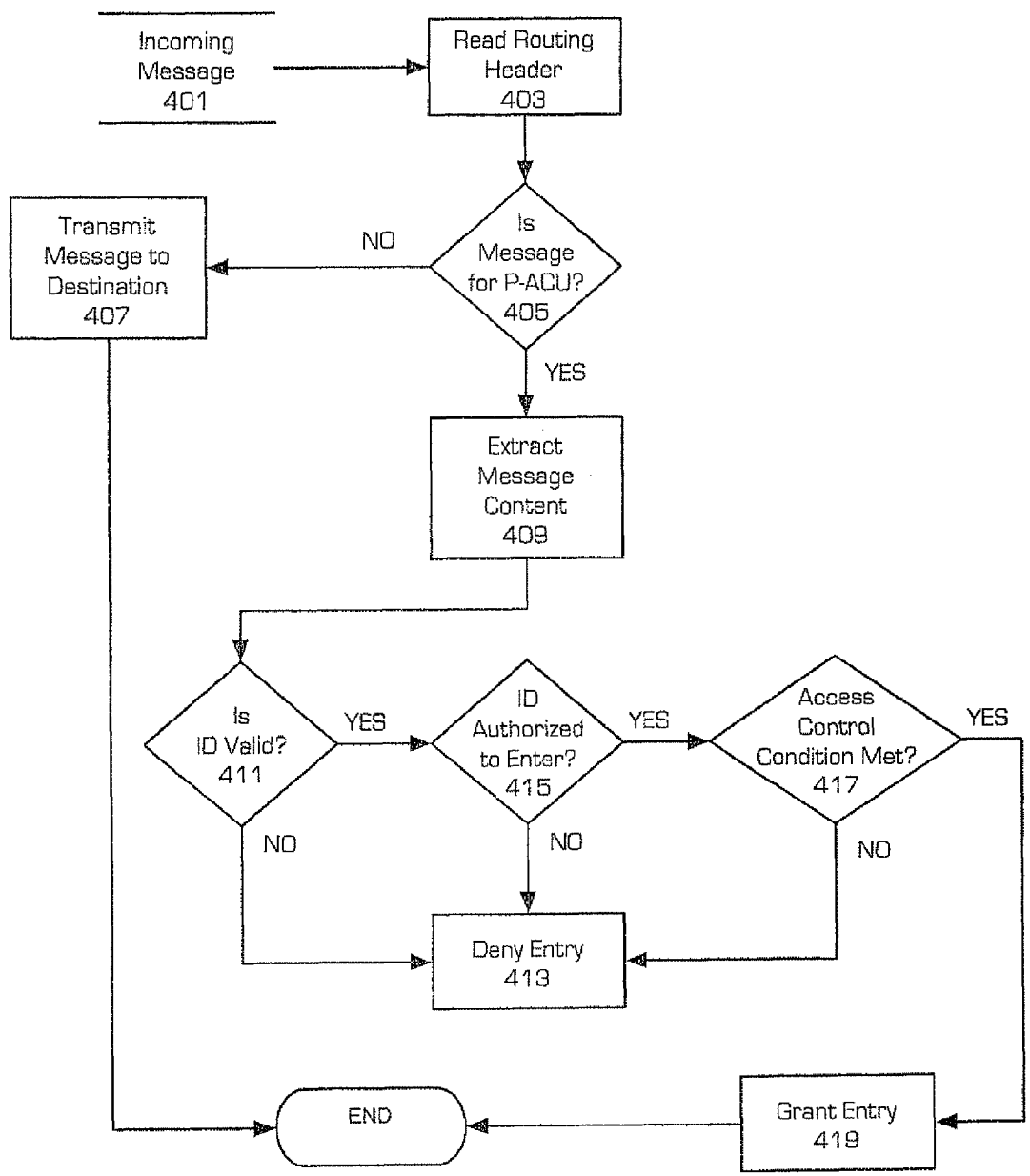

METHOD OF ACCESS CONTROL IMPLEMENTED IN AN ETHERNET SWITCH

I. FIELD OF THE INVENTION

The present invention relates generally to security system. More specifically, the present invention relates to a system and method for providing access control in an Ethernet switch.

II. BACKGROUND OF THE INVENTION

There are many building access control features that require information to be known by more than one controller. The information is needed to make decisions regarding allowing or preventing access to a premises or particular room. Conventionally, a primary access control unit, networked to other access control units, performs access control functions of this type. The primary access control unit decides what information needs to be distributed to other access control units. The primary access control unit is used for implementing various access control schemes, such as anti-passback, 2-man rule, n-man rule, and various supervisor procedures.

The anti-passback access control scheme prevents an authorized user from presenting a credential card to access an area, and then "passing back" that card, through for example a window or another door, to an unauthorized user, who then uses the same card to access the area.

Anti-passback is accomplished by the use of two credential readers, one on entry and one on egress, at particular doors. Users must present their card to enter, and also to exit the area. The access control system registers when someone has entered, and when he or she has left. If someone enters and passes back his or her card to another person, the unauthorized user will not gain entry, because the system will recognize that the proper user's card already has been used to enter the building and that no subsequent egress has been logged for that card. Therefore, the use of the card by the second user is invalid.

The 2-man and n-man rule access control schemes require that two authorized personnel, in the 2-man rule case, or some other number of authorized personnel, in the n-man rule case, be the minimum number of personnel in a room so controlled. Thus, in the 2-man rule controlled room, the room is either unoccupied or there are at least two authorized personnel in the room simultaneously. These types of access control schemes are useful where verification of an occupant's actions is desirable. For example, often banks employ a 2-man rule when emptying an automated teller machine (ATM), thus two bank employees are required to be present in the ATM room while the received deposits are cataloged and processed. In this way, the possibility of theft can be greatly reduced.

Referring to FIG. 1, a conventional access control system is shown. The primary access control unit (P-ACU) 10 receives from and sends messages to access control units (ACU), such as card reader 30, RF-ID reader 40, biometric scanner 50, and other ACUs 60 as known in the art. The ACUs 30, 40, 50 and 60 are generally connected to the P-ACU 10 using an Ethernet infrastructure. While the Ethernet infrastructure shown in FIG. 1 is a wired Ethernet network, the network can be wired or wireless. An Ethernet routing device 20, such as an Ethernet switch, or router, is employed to coordinate Ethernet message traffic to efficiently utilize available network bandwidth. The Ethernet routing device 20 identifies the destination of a message but does not read the content of the message.

The disadvantage of the conventional access control scheme is that both sets of hardware—primary access control unit and Ethernet routing device—are needed to efficiently control the access network.

III. SUMMARY OF THE INVENTION

An embodiment of the present invention provides an access control system having at least one access control unit for securing a physical area and controlling entry into and egress out of the physical area; and an Ethernet routing device. The Ethernet routing device further includes an access controller for determining access privileges to the physical area; an Ethernet switching unit for directing network communications between multiple network devices; at least one Ethernet connector for connecting the at least one access control unit to the Ethernet routing device; and an access control message interpreter for reading messages received, by way of the Ethernet connector, from the at least one access control unit and providing access control information contained in the messages to the access controller for access privilege determination.

Additionally, the Ethernet routing device of the present invention includes an access rules storage unit for storing information regarding authorized personnel. The stored information is used by the access controller for determining identity and access privileges of the authorized personnel.

IV. BRIEF DESCRIPTION OF THE DRAWINGS

These and other features, aspects, and advantages of the present invention will become better understood with regard to the following description, appended claims, and accompanying drawings wherein:

FIG. 4 illustrates a flow diagram of a process for access control executed by an Ethernet routing device of the present invention

V. DETAILED DESCRIPTION OF THE INVENTION

Figure 1:
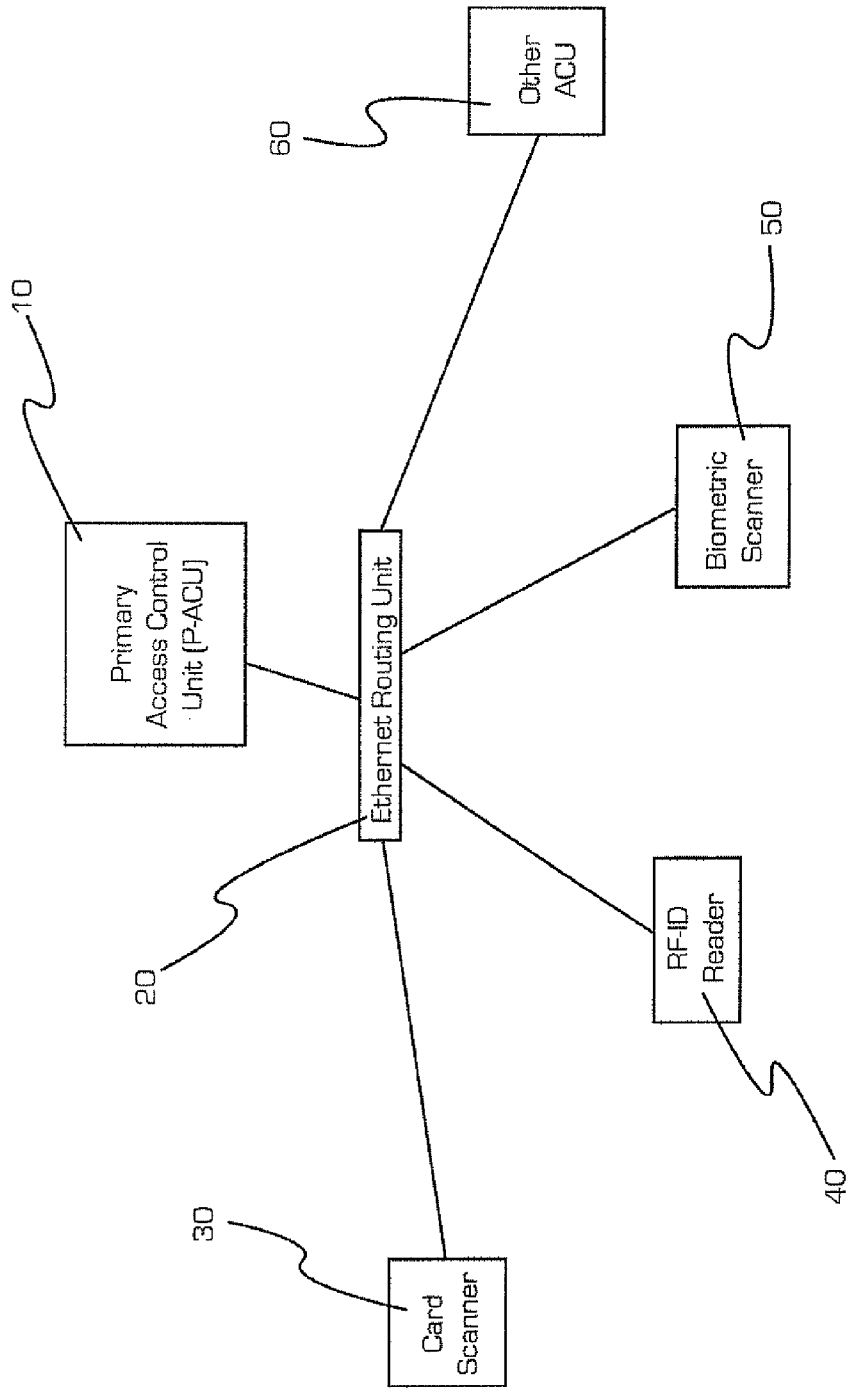
FIG. 1 illustrates a block representation of a conventional access control system.
Figure 2:
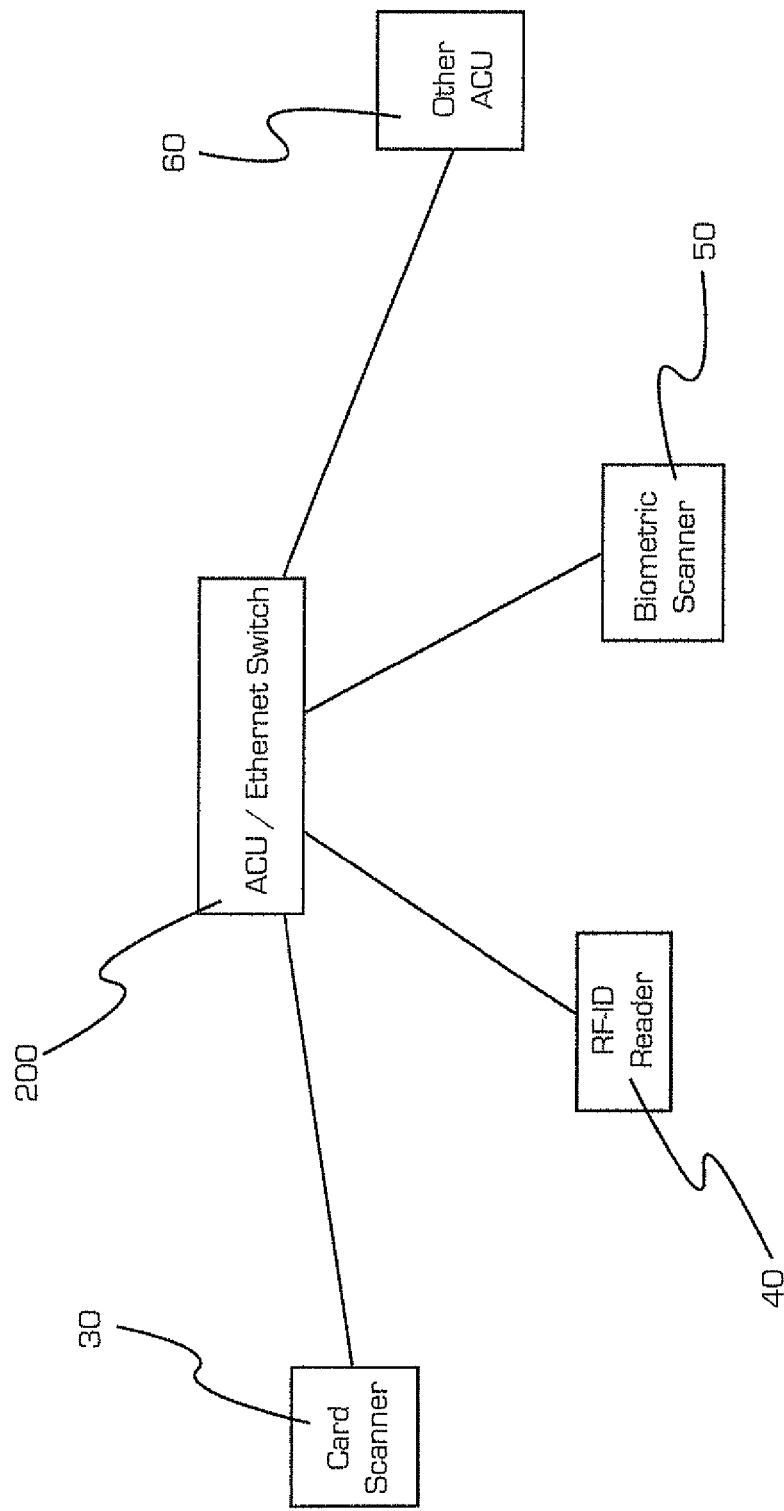
FIG. 2 illustrates a block representation of an embodiment of an access control system in accordance with the present invention.

FIG. 2 provides a block representation of an access control system in accordance with an embodiment of the present invention. As shown, the Ethernet routing device 200 of the present invention is connected to access control units (ACU), such as card reader 30, RF-ID reader 40, biometric scanner 50, and other ACUs 60 as known in the art. The Ethernet routing device 200 provides network message routing for connected network devices. However, unlike the prior art shown in FIG. 1, a separate P-ACU is not required. Rather, the Ethernet routing device 200 also performs the function of identifying messages intended for a P-ACU and analyzes the message content to determine whether or not the ID credentials provided by the originating ACU is valid and the credentials holder is authorized for entry into the secured area.

Additionally, in cases where complex access control schemes are employed, such as the above-mentioned anti-passback and n-man rule, the Ethernet routing device 200 further determines if the access control scheme requirements are met before granting entry. Entry is granted or denied by way of a message sent from the Ethernet routing device 200 to the originating ACU instructing the ACU to allow or deny entry. Ideally, the Ethernet routing device 200 also sends a notification to a security terminal and logs the event.

Figure 3:
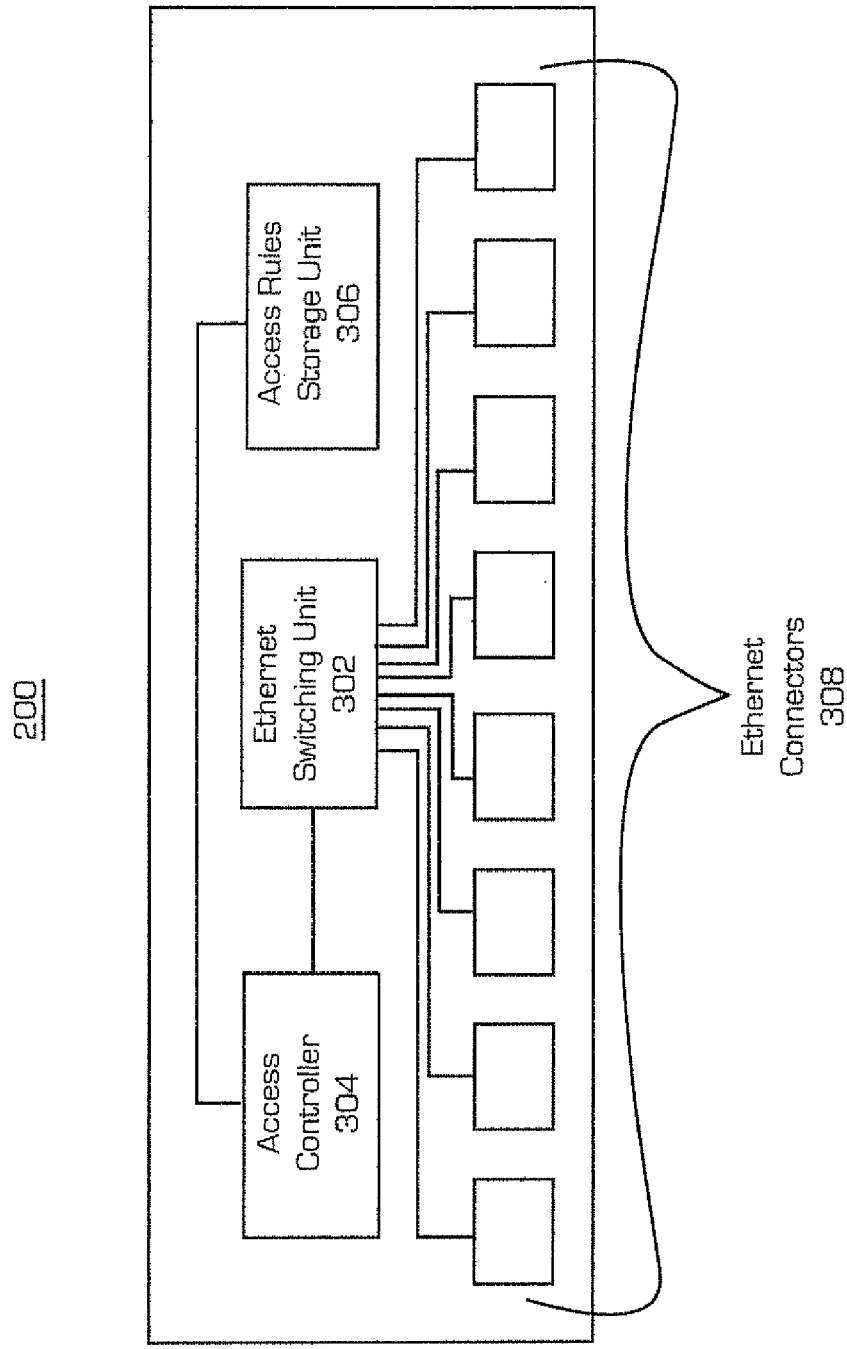
FIG. 3 illustrates a schematic representation of an Ethernet routing device in accordance with the present invention.

Turning to FIG. 3, the Ethernet routing device 200 is shown having the various components. The Ethernet routing device 200 includes a Ethernet switching unit 302 that is in communication with an access controller 304. In addition, an access rules storage unit 306 is provided and accessible by the access controller 304.

The access rules storage unit 306 stores information regarding identification and access privileges of personnel. The information can include personal information such as employee name and ID information, a unique code associated with an employee card key, RF-ID tag, biometric data, etc. The access privileges may specify a level of access the employee is granted, to which areas access is granted, and any access control schemes, which apply to the employee or particular secured areas.

ACUs, as well as other non-access control related network devices, can be connected to the Ethernet routing device 200 by way of the Ethernet connectors 308. For non-ACU devices connected to the Ethernet connectors 308, the Ethernet routing device 200 handles routing of messages between the non-ACU network devices by reading the routing header of incoming files and redirecting the messages to the proper destination without reading the message content.

Turning to FIG. 4, a flow diagram is provided showing a process for access control performed by an Ethernet routing device of the present invention. Initially, the Ethernet routing device in step 401 receives a message. The Ethernet routing device reads the routing header of the incoming message in step 403. Based on the routing header, the Ethernet routing device determines whether the message is intended for a P-ACU or for a non-access control related network device in step 405. If the message is intended for a non-access control related network device, the message is transferred to the destination device in step 407.

However, if the messages is intended for a P-ACU, or originates from an ACU, the Ethernet routing device extracts the message content in step 409. The Ethernet routing device verifies that the ID information contained in the message is valid in step 411. The ID verification can be performed by comparing the received ID information against a stored list of employee IDs. Other methods of verification well known in the art may be used as well. If the ID is found to be invalid in step 411, the Ethernet routing device denies entry in step 413.

However, if the ID is found to be valid, the process continues to step 415 where the Ethernet routing device determines if the ID holder is authorized to access the particular area secured by the originating ACU. Complex access privileges can be stored in, for example, a database in which an ID can be cross-referenced by the Ethernet routing device with one or more access privileges and with access requirements of the originating ACU. This allows for personnel to be authorized to enter only certain areas but not authorized to enter other areas. If the ID holder is not authorized to enter the area secured by the originating ACU, access is denied in step 413.

On the other hand, if the ID holder is authorized to enter the area, the Ethernet routing device determines whether all required access control schemes applicable to the area are met in step 417. For example, one scheme that may be employed is the n-man rule where at least n number of authorized personnel must be in the area or the area must be unoccupied. In this case, the Ethernet routing device determines if the required n number of personnel have already entered the area. Tracking and storing the entrance and egress of personnel into secured areas by the Ethernet routing device can accomplish this. If the access control requirements are not met entry is denied in step 413. If all the access control requirements are met, the ID holder is granted entry into the area in step 419.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A device for use in an access control system, said device comprising:
   an access controller that determines access privileges to a physical area;
   an Ethernet switching unit for directing network communications between multiple network devices;
   at least two Ethernet connectors, a first Ethernet connector that connects at least one access control unit to said device, and a second Ethernet connector that connects at least one non-access control related network unit to said device; and
   an access control message interpreter
      that reads router headers of messages received by way of said Ethernet connectors,
      that determines if said messages are from said at least one access control unit or if said messages are from said at least one non-access control related network unit,
      that transfers said messages to a destination unit without reading message content when said messages are from said at least one non-access control related network unit, and
      that extracts message content not in said router headers of said messages and provides said message content to said access controller for access privilege determination when said messages are from said at least one access control unit.

2. The device as in claim 1, wherein said at least one access control unit is selected from a group consisting of: ID card reader, RF-ID reader and biometric scanner.

3. The device as in claim 1, wherein said access controller implements at least one access control scheme selected from a group consisting of: antipassback, 2-man rule and n-man rule.

4. The device as in claim 1, further comprising an access rules storage unit for storing information regarding authorized personnel used for determining identity and access privileges of said authorized personnel.

5. The device as in claim 1, wherein said access controller, upon receiving said access control information, determines identity and access privileges, and based on said determination transmits a message to said access control unit originating said message granting or denying access.

6. An access control system, comprising:
   at least one access control unit that secures a physical area and controls entry into and egress out of said physical area; and
   an Ethernet routing device having:
      an access controller that determines access privileges to said physical area;
      an Ethernet switching unit that directs network communications between multiple network devices;
      at least two Ethernet connectors, including a first Ethernet connector that connects said at least one access control unit to said Ethernet routing device, and a second Ethernet connector that connects at least one non-access control related network unit to said Ethernet routing device; and an access control message interpreter that reads router headers of messages received by way of said Ethernet connectors, said access control message interpreter determines if said messages are from said at least access control unit or if said messages are from said at least one non-access control related network unit, said access control message interpreter transfers said messages to a destination unit without reading message content when said messages are from said at least one non-access control related network unit, and said access control message interpreter extracts message content not in said router headers of said messages and providing said message content to said access controller for access privilege determination when said messages are from said at least one access control unit.

7. The access control system as in claim 6, wherein said at least one access control unit is selected from a group consisting of: ID card reader, RF-ID reader and biometric scanner.

8. The access control system as in claim 6, wherein said access controller implements at least one access control scheme selected from a group consisting of: anti-passback, 2-man rule and n-man rule.

9. The access control system as in claim 6, further comprising an access rules storage unit for storing information regarding authorized personnel used for determining identity and access privileges of said authorized personnel.

* * * * *